Figure 1:
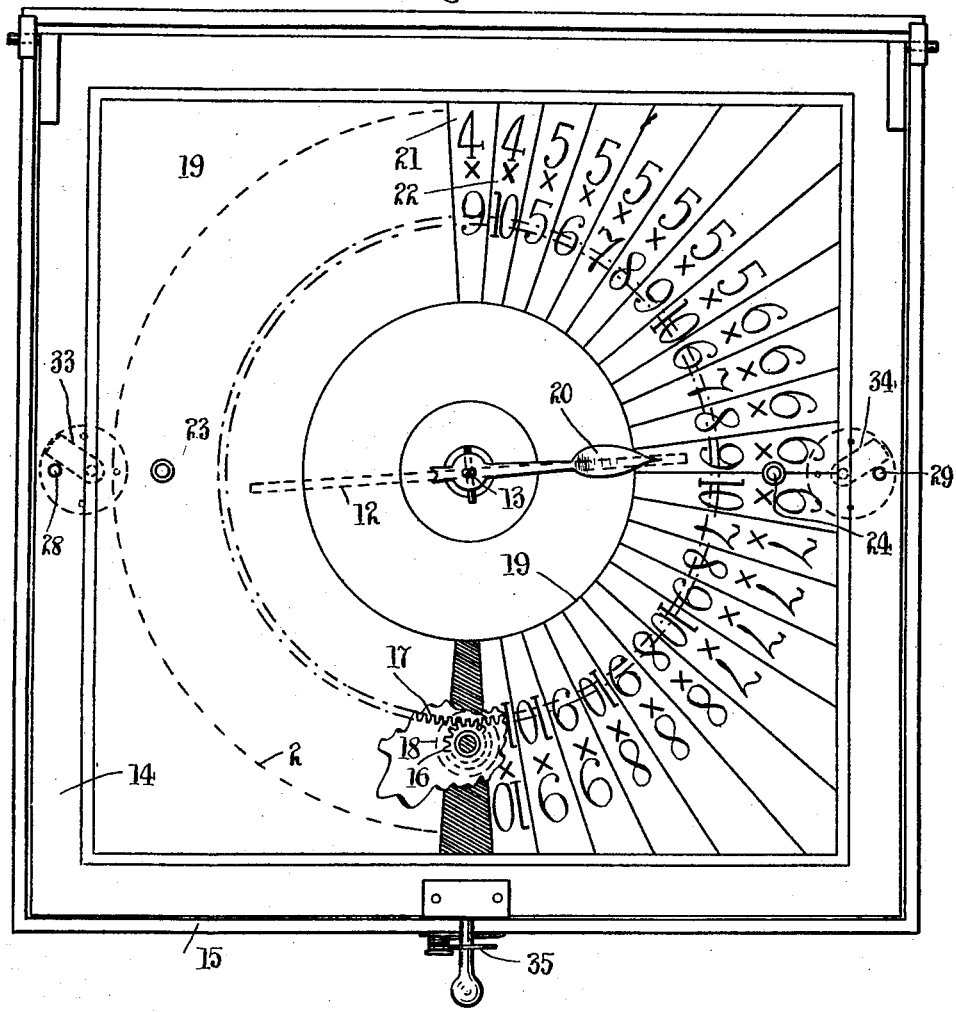

Feb. 3, 1925.

J. KAUFMANN

EDUCATIONAL GAME

Filed July 21, 1924   3 Sheets-Sheet 1

1,525,396

Inventor
Jacob Kaufmann
by Ernest Wilkinson
Attorney.

Feb. 3, 1925.  1,525,396
J. KAUFMANN
EDUCATIONAL GAME
Filed July 21, 1924   3 Sheets-Sheet 2
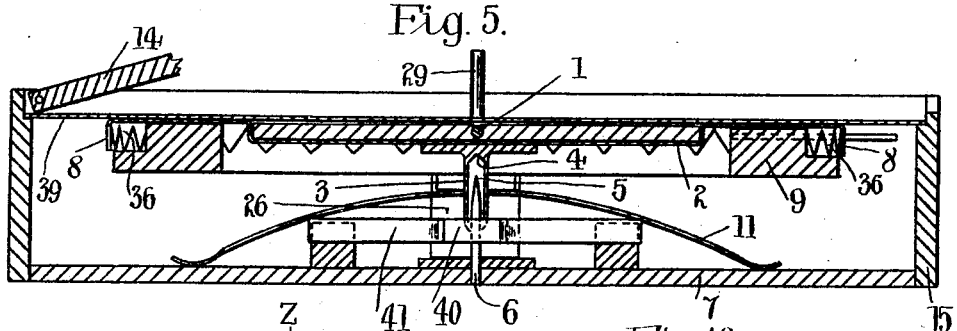
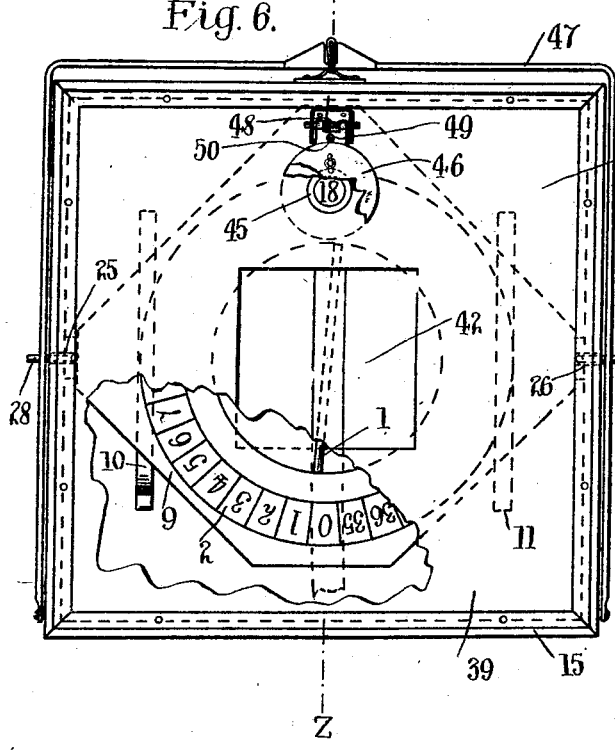
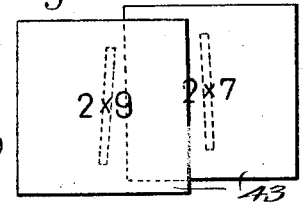
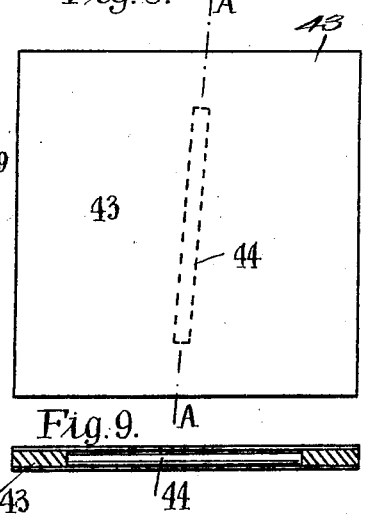
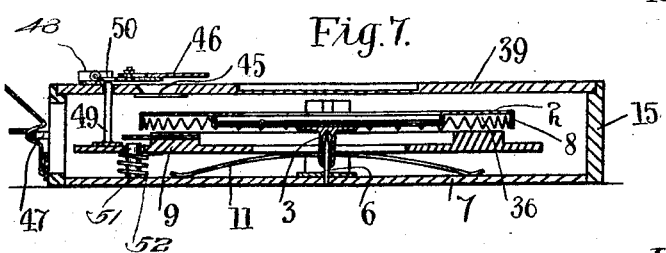
Inventor
Jacob Kaufmann
by Ernest Wilkinson
Attorney.

Feb. 3, 1925.　　　　　　　　　　1,525,396
J. KAUFMANN
EDUCATIONAL GAME
Filed July 21, 1924　　　3 Sheets-Sheet 3
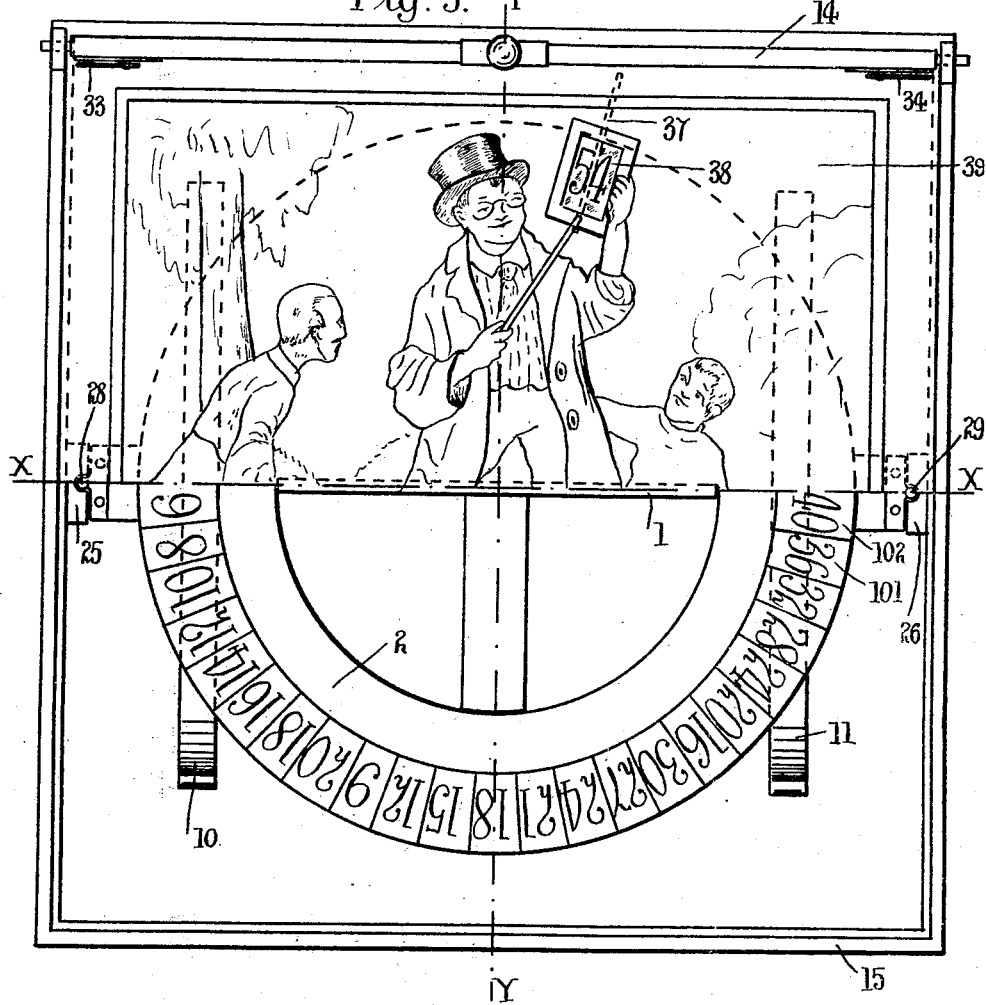
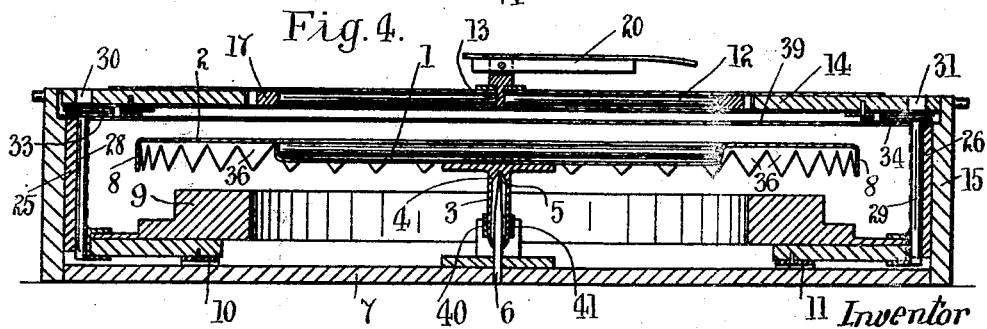
Inventor
Jacob Kaufmann
by Ernest Wilkinson
Attorney.

Patented Feb. 3, 1925.

1,525,396

UNITED STATES PATENT OFFICE.

JACOB KAUFMANN, OF BERLIN, GERMANY.

EDUCATIONAL GAME.

Application filed July 21, 1924. Serial No. 727,311.

*To all whom it may concern:*

Be it known that I, JACOB KAUFMANN, a citizen of the German Republic, residing at Berlin, Germany, have invented certain new and useful Improvements in or Relating to Educational Games, of which the following is a specification.

The present invention relates to improvements in or relating to educational games. According to the present invention the directive force of a movable magnet is arranged to act on a freely suspended magnet to which a card or disc is attached so that different local areas of the card or disc may be brought to one or the same station according to the setting of the movable magnet.

Appropriate means are provided for setting the movable magnet, preferably also means are provided for lowering and lifting the card or disc to and from its centre pivot so as to release the disc for directive action and hold it in its new position and protect the bearing from injury when the appliance is not in use.

In the accompanying drawings I illustrate by way of example, several forms of my invention so that those skilled in the art may be properly instructed therein, and I shall hereinafter refer to these drawings (specifically) by reference letters in the following description of these various embodiments of my invention.

In the drawings:—

Figure 2:
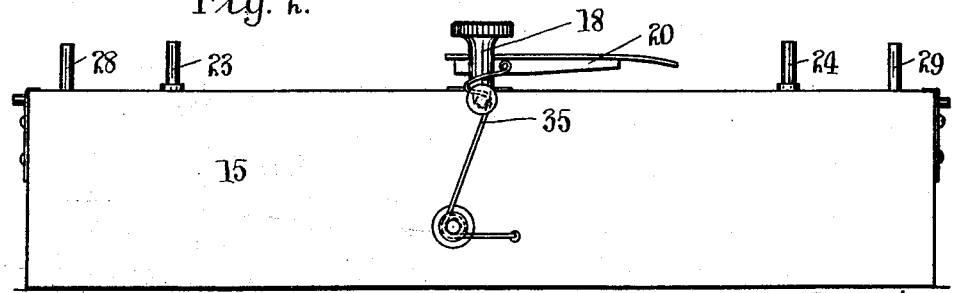

Fig. 1 is a plan view of one form of the invention. Fig. 2 a front elevation,

Fig. 3 a plan view with the hinged lid raised, shewing the picture beneath the lid, the picture being cut by line X—X to shew the interior of the box.

Fig. 4 is a front sectional view, and

Fig. 5 a sectional side view through the line Y—Y, Fig. 3.

Fig. 6 is a plan view of a modified construction,

Fig. 7 a sectional side view through the line Z—Z of Fig. 6.

Fig. 8 a plan of one of the magnet carrying plates.

Fig. 9 a sectional view through A—A, Fig. 8, and

Figure 10 is a plan view of a plurality of indicia bearing magnet carrying plates.

Referring first to Figs. 1 to 5, in this construction under the present invention 1 is a freely suspended magnet, in the form of a single bar magnet, which is attached in a diametrical position to a disc 2 in the centre of which is a tube 3 with a hard centre 4 worked to the form of an open cone or the like which can be mounted on the pivot 5 of a pivot stem 6 rising from the base 7 of the appliance.

Under the disc 2 which has a depending rim 8 at its periphery is a lifting ring or circular or other frame 9 which is supported in a raised position on springs, conveniently a pair of arched blade springs 10, 11 so that it requires to be depressed against the lifting tension of the springs to let down the disc 2 onto its pivot 5 and leave the disc 2 freely suspended thereon.

Above the disc 2 is arranged a movable magnet 12. In the construction now being described the movable magnet 12 is rotatably mounted in a diametrical position with respect to a turning axis 13, in a hollow hinged lid 14 of a box 15 whose bottom forms the base 7 of the appliance, and a pair of gear elements 16, 17 comprising a small driver 16, and a finger knob 18 form convenient means for varying the position of the movable magnet from the outside of the lid 14 by a slow movement.

If now the position of the movable magnet 12 is altered while the other magnet 1 is freely suspended and under its influence the other magnet 1 will assume a new position corresponding thereto.

The different positions of the movable magnet 1 may be conveniently related to a radially divided indicator or chart 19 with the aid of a pointer 20 mounted on the turning axis 13, and as to each and every such division 21, 22, etc., a certain one of similar radial divisions 100, 101, etc., on the disc 2 will always appear at a given station, the corresponding divisions on the indicator 19 and disc 2 may be marked for question and answer.

For example multiplication, addition, division, or subtraction sums may be marked on the indicator 19, or on different indicators adapted to be interchanged or superimposed in proper position with the aid of steadying pins 23, 24 or means of that character, these sums corresponding to the set of answers on the disc.

Various indicating, carting, or displaying matter may however be devised and adopted without departing from the present invention.

Included in the present invention is a movable or hinged lid arrangement for letting down the disc 2 so that it shall be held freely suspended on its pivot 5.

The spring lifting ring or frame 9 is vertically slide guided at 25, 26 in a box 15 so that the slides 28, 29 register with and project through holes 30, 31 in the hollow movable or hinged box-lid 14 in which the movable magnet 12 is mounted.

On the inside of the lid 14 are turn buttons 33, 34 or the like which may be positioned to cover the holes 30, 31 therein and prevent the entrance therein of the slides 28, 29 so that on closing the lid 32 the lifting ring or frame 9 is depressed to float the disc 2 on its pivot 5, and on opening the lid 32 the lifting ring or frame 9 is raised by its springs 10, 11 to non-rotatably hold the disc 2 off its pivot 5.

The lid 32 may be locked in the closed position by a spring catch 35.

In order to bring the disc to definite position at each and every new magnetic setting the depending rim 8 may be provided with V-notches 36 medially of the radial divisions thereon and a radial arm 37 may be provided on the lifting ring or frame 9 to enter the corresponding V-notch and centre the division corresponding to the setting, in relation to a window 38 through which it is displayed.

This window 38 may be a glazed opening in a permanent lid or top 39 of the box 15 and may appear as a part of a picture such as for example the slate of a schoolmaster teaching a group of school children. One of the divisions on the disc 2 corresponding to a blank on the indicator or chart 19 may be left blank and coloured black so as when displayed to make the window 38 appear as a slate which has been cleaned.

When the disc 2 is suspended the tube or cap 3 in its centre may receive a slight braking pressure by the straightening tension of light spring strips 40, 41 between which and the pivot stem 6 the tube or cap 3 enters.

As a modification of the foregoing, and referring now to Figs. 6 to 9, the fixed top 39 of the box 15 may be recessed, a square recess 42 serving well, and correspondingly shaped plates 43, etc., etc., concealingly embodying differently obliquely set bar magnets 44 provided to fit therein, any one of which being placed in the recess 42 directs the disc magnet 1 accordingly.

Over a window 45 in the fixed top is a movable or hinged lid 46 which is normally closed but which is opened on releasing a movable or pivoted frame 47 by which the slides 28, 29 of the lifting ring or frame 9 are depressed to suspend the magnet disc 2 which then responds and positions itself as before described.

The hinged lid 46 is provided with a spring 48 to normally urge the lid into closed position. The lifting frame or ring 9 has a pin 49 at one side in line with the lid 46 for swinging it into open position when the ring 9, being first released by the frame or bail 47, moves upwardly to lock the magnet disc or member 2 in its new position. As shown in Figure 6, the lid 46 has an opening 50 therein through which the pin 49 may freely pass without lifting the lid 46, but which may be closed by the adjustment of the sliding parts of the lid to operate the latter as above explained. The pin 49 is maintained in line with the opening by a pin 51 rising from the bottom of the casing and entering an opening in the frame 9, and may have a light spring 52 thereabout for gently urging the pin 49 toward the lid 46.

Any desired number of the plates 43 may be used, the same may each bear a suitable question or problem, as shown in Figure 10, which is answered or solved by the corresponding data borne by the magnet disc 2, such as shown in Figure 6. The bar magnets 44 are set at the corresponding angular positions about the axes of the plates 43 to effect the necessary turning of the disc 2. Some of the plates, as shown in Figure 8 may be left blank, or without any surface marking, so that when placed in the game device the player does not know what number or indicia may be brought into view through the sight opening; thus imparting an element of chance to the game. This may be effected by placing bar magnets 44 in the blank plates 43 at various angular positions about the axes of the plates which are not known to the players.

It is preferred to place the markings such as the numbers or other indicia on the outer marginal portion of the magnet disc 2 as shown.

What I claim is:—

1. A game apparatus comprising a box, a magnet pivoted for horizontal swinging movement in the box, an indicia bearing disc secured to the magnet to turn therewith, said box having a top for closing the same and provided with a sight opening located to display the indicia of the disc one at a time, a movable magnet arranged above the first magnet and adapted to direct the free swinging magnet into different positions dependent upon the axial angular disposition of the second magnet, and locking means for said disc to secure the same in adjusted position subsequent to its turning into a new position under the influence of the second magnet.

2. A game device comprising a box having a cover with a sight opening therein, a disc mounted to turn horizontally in the box and having indicia thereon adapted to be moved one at a time into line with the the sight opening, a magnet fixed in the disc for turning the same, said disc having a notch therein in register with each indicia, locking means to engage in the notches to lock the disc from turning when adjusted and for centering the indicia beneath said sight opening, and an adjustable magnet in the box adapted to be placed in an axial angular position corresponding to the indicia to be displayed through the sight opening and adapted to influence the turning of the disc when released by said locking means.

3. A game device comprising a box, a magnetic disc pivoted for horizontal turning in the box and bearing indicia thereon, said box having a sight opening in its top to display said indicia one at a time, a second magnet adapted to be adjusted in the box for influencing the turning of said disc to display the desired indicia, and a combined locking and centering device mounted in the box to engage said disc subsequent to its adjustment into a new position to center the adjacent indicia beneath the sight opening and to lock the disc from further turning.

4. A game device comprising a box, a magnet carrying disc mounted for horizontal turning in the box and having indicia thereon, said box having a sight opening therein through which the indicia may be displayed one at a time and a plurality of interchangeable carriers adapted to be fitted one at a time in the box for influencing the turning of the disc into different positions, said carriers each having a bar magnet arranged therein at the desired axial angular position for adjusting said disc to display the desired indicia corresponding to the carrier used.

5. A game device comprising a box, a magnet carrying disc mounted to turn horizontally in the box and bearing indicia adapted to be displayed one at a time through the top of the box, a spring pressed ring arranged in the bottom of the box and normally urged toward said disc, a radially extending pin mounted on the ring, said ring provided on its under side and in register with the indicia with notches adapted to receive said pin one at a time, means for depressing said ring, a magnet arranged for adjustment in the box for influencing said disc to turn to a desired position, said ring when released being adapted to engage the pin in an adjacent notch for centering the indicia for display through the top of the box and for locking the disc against movement.

In testimony whereof, I affix my signature.

JACOB KAUFMANN.